United States Patent
Lemos et al.

(10) Patent No.: US 9,004,843 B2
(45) Date of Patent: Apr. 14, 2015

(54) METHOD AND APPARATUS FOR HANDLING AEROGENERATOR BLADES

(75) Inventors: Phillips Antonio Da Costa Lemos, Sorocaba (BR); Caio Teruo Hideshima, Sorocaba (BR); Tatiane Rabello Koga, Sorocaba (BR); Tomaz Schmidt Cavalcante, Sorocaba (BR)

(73) Assignee: Tecsis Tecnologia E Sistemas Avançados S.A., Sao Paulo (BR)

(*) Notice: Subject to any disclaimer, the term of this patent is extended or adjusted under 35 U.S.C. 154(b) by 349 days.

(21) Appl. No.: 12/922,319

(22) PCT Filed: Mar. 13, 2008

(86) PCT No.: PCT/IB2008/050909
§ 371 (c)(1),
(2), (4) Date: Sep. 13, 2010

(87) PCT Pub. No.: WO2009/112887
PCT Pub. Date: Sep. 17, 2009

(65) Prior Publication Data
US 2011/0008147 A1    Jan. 13, 2011

(51) Int. Cl.
*B60P 3/40* (2006.01)
*B66C 1/10* (2006.01)
*F03D 1/00* (2006.01)

(52) U.S. Cl.
CPC ............... *B66C 1/108* (2013.01); *F03D 1/005* (2013.01); *F05B 2230/60* (2013.01); *F05B 2230/61* (2013.01); *F05B 2230/80* (2013.01); *Y02E 10/721* (2013.01)

(58) Field of Classification Search
CPC ....... B62B 1/262; B62B 2203/44; B60P 3/40; B60P 7/12
USPC ............... 414/624, 625, 448, 450; 280/47.34, 280/47.35, 79.6; 410/44, 45, 50, 51, 122; 294/67.3, 67.31
See application file for complete search history.

(56) References Cited

U.S. PATENT DOCUMENTS

| | | | | |
|---|---|---|---|---|
| 2,594,586 A | * | 4/1952 | Ries | 280/43.24 |
| 2,851,235 A | * | 9/1958 | Henig | 410/44 |
| 3,013,807 A | * | 12/1961 | Winterhoff | 15/246.4 |
| 3,052,441 A | * | 9/1962 | Fleischman | 248/141 |
| 3,086,664 A | * | 4/1963 | Gribble | 414/456 |
| 3,430,981 A | * | 3/1969 | Tarantola | 410/44 |

(Continued)

FOREIGN PATENT DOCUMENTS

| | | |
|---|---|---|
| DE | 102 11 357 A1 | 9/2002 |
| GB | 2 119 303 A | 11/1983 |
| WO | 2004/043679 A1 | 5/2004 |

*Primary Examiner* — Jonathan Snelting
(74) *Attorney, Agent, or Firm* — Sughrue Mion, PLLC

(57) ABSTRACT

Method and apparatus for handling aerogenerator blades that provide a versatile means for handling aerogenerator blades without an unbalanced distribution of the loads in the blade. The method comprises positioning an upper mounting part (103) over the blade after the upper mold has been retracted; lifting the blade with the upper mounting part from the under mold using a lifting means; positioning the blade over an under mounting part (104) which is fixedly attached to an inferior movable support (102); attaching the upper mounting part to the under mounting part, wherein the upper and under mounting parts together have the inner surface substantially corresponding to the shape of the blade outer profile section. The invention further comprises an apparatus for handling aerogenerator blades.

13 Claims, 3 Drawing Sheets

(56) References Cited

U.S. PATENT DOCUMENTS

| | | | | |
|---|---|---|---|---|
| 4,365,919 A | * | 12/1982 | Mehki | 410/120 |
| 4,738,582 A | * | 4/1988 | Roberts | 414/546 |
| 5,622,116 A | * | 4/1997 | Carlton | 105/355 |
| 6,086,310 A | * | 7/2000 | Lujan et al. | 414/444 |
| 6,368,048 B2 | * | 4/2002 | Womble et al. | 414/590 |
| H2061 H | * | 4/2003 | Tunnell | 410/47 |
| 2007/0177954 A1 | * | 8/2007 | Kootstra et al. | 410/44 |

* cited by examiner

METHOD AND APPARATUS FOR HANDLING AEROGENERATOR BLADES

TECHNICAL FIELD

This invention relates to methods and apparatuses for handling aerogenerator blades.

BACKGROUND ART

Aerogenerator blades, also know as wind rotor blades or wind turbine blades, which are used to generate electrical power from the wind are well know in the prior art. Most commercial blades used for higher than 1.0 MW applications range from about 25 to 60 meters (about 82 to 196 feet) in length with a maximum chord from about 1.5 to 5 meters (about 3.3 to 16.4 feet). Due to the growth in the demand for renewable energy, the blades have grown in size so that nowadays even larger blades are being designed.

Most known processes for manufacturing aerogenerator blades use a fixed or under mould and a rotatable or upper mould, in which a plurality of layers are laminated together forming two shells with an outer aerodynamic shape according to the inner surface of the moulds. The layers can be of any suitable material such as, but not limited to, fiber, metal, plastic, wood, and/or a combination thereof, which are laminated with a resin, such as, but not limited to, epoxy, vinylester, polyester resin, and/or a combination thereof. Many processes may be used for laminating the resin, such as, but not limited to, resin transfer molding, resin film infusion, etc. In addition to the shells that determine the aerodynamic profile, some extra internal structural members such as shear webs and spar caps may provide important aid in the structural strengthening and supporting of the shells. Some components, such as, but not limited to, spar caps, shear webs, the root section, and/or parts thereof, may be pre-formed or pre-fabricated. After laminating the two shell halves and positioning the additional internal structural members, the two moulds are closed using an active hinge mechanism or a crane, and the two shell halves are glued together. After curing the resin, the upper mould is retracted and the blade is lifted from the under mould usually with straps driven by overhead cranes, which move the blades to the subsequent manufacturing steps, such as outer surface finishing and painting. During such steps, it may be desirable to rotate the blade over it axis from a 'horizontal' position (i.e.: with the chord line substantially in a horizontal position) to a 'vertical' position (i.e.: with the chord line substantially in a vertical position). It may also be desirable to move the blade from one production line station to another, outside the overhead crane reach.

DISCLOSURE OF INVENTION

Disclosure

It is well known, however, that the aerogenerator blade design is directed to the aerodynamic design, which objective is to maximize the energy yield for the specified wind speed distribution and to limit the maximum power output in the case of stall regulated machines; while the structural design, including material selection, is optimized for restricting extreme and fatigue loads, avoid resonances and minimize weight and costs, all of them 'on site' working conditions. Hence, properly handling blades during the manufacturing process became a rather complicated issue. For instance, some parts of a blade such as the trailing and leading edges may be relatively fragile. Hence, an unbalanced load resultant from a flexible strap may cause damage to the blade edges. Depending on the structural design of the blade, unbalanced distribution of the loads during handling may cause irreparable damages or even completely break the blades. To solve this problem, it is this invention embodies methods and apparatuses for handling aerogenerator blades that provide a versatile means for handling aerogenerator blades without an unbalanced distribution of the loads in the blade.

DESCRIPTION OF DRAWINGS

The accompanying drawings are not intended to be drawn on scale. In the drawings, each identical or nearly identical component that is illustrated in various figures is represented by a like numeral. For purposes of clarity, not every component may be labeled in every drawing.

MODE FOR INVENTION

Figure 1:
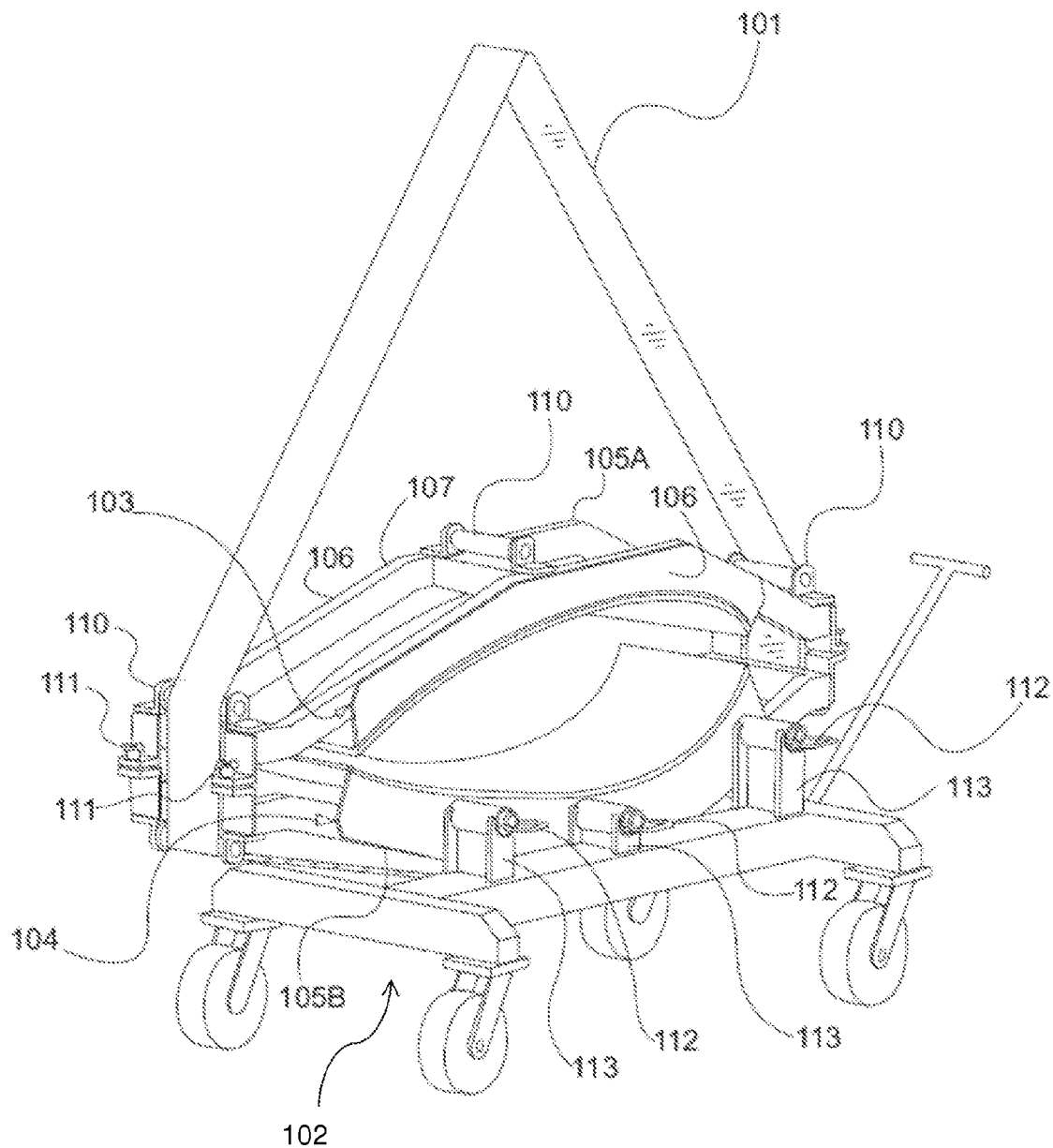
FIG. 01 is a perspective view of an embodiment of the present invention with the mounting in a substantially horizontal position, an inferior support and a strap.

This invention is not limited in its application to the details of construction and the arrangement of components set forth in the following description or illustrated in the drawings. The invention is capable of other embodiments and of being practiced or carried out in various ways. Also, the phraseology and terminology used herein is for the purpose of description and should not be regarded as limiting. The use of 'including', 'comprising', or 'having', 'containing', 'involving', and variations thereof herein, is meant to encompass the items listed thereafter and equivalents thereof as well as additional items.

FIG. 01 illustrates in a perspective view one exemplary embodiment of the present invention with the mounting, the inferior support and the strap. The mounting is in a substantially horizontal position, i.e. with the chord line of the blade (not shown) in a substantially horizontal position.

The mounting is adapted for receiving a strap (101), said strap configured for holding the mounting with the supported blade and for securing the rotation of the mounting in its axis together with the blade, wherein such mounting is adapted for being fixedly placed in an inferior support (102) when the mounting is in a substantially horizontal position and said mounting further comprises an upper mounting part (103) and an under mounting part (104), wherein the upper mounting part (103) is configured to be fixedly connected to the under mounting part (104).

The upper mounting part (103) includes: a main frame (105A) with two ends, two lateral areas (106), one outer side (107) and one inner side; one lateral supporting plate (109) (reference numeral not shown in FIG. 01 for clarity purposes) in each lateral area (106) of the main frame (105A); an upper layer fixed by the lateral supporting plates (109) beneath the inner side of the main frame (105A), the layer having the surface substantially corresponding to the shape of one side of the blade outer profile section; and a plurality of upper rollers (110) connected to the outer side of the main frame (105A).

The under mounting part (104) respectively includes (reference numbers not shown for clarity purposes) a main frame (105B) with two ends, two lateral areas, and one outer side and one inner side; one lateral supporting plate in each lateral area of the main frame (105B); an upper layer fixed by the lateral supporting plates beneath the inner side of the main frame (105B), the layer having the surface substantially corresponding to the shape of one side of the blade outer profile section; and a plurality of under rollers connected to the outer side of the main frame (105B). In one embodiment of the invention, the lateral supporting plates may have a plurality of holes for reducing the weight of the plates. The main frames (105A and 105B) may each have at least one end side attaching hole in each end of the main frame (105A) of the upper mounting part (103) and the main frame (105B) of the under mounting part (104), for receiving fasteners (111) for securely attaching the upper mounting part (103) to the under mounting part (104). The attaching holes may be positioned in a joint plate connected to the ends of the main frames (105A and 105B). The lateral supporting plates of the main frame (105B) may have passage holes for receiving locking pins (112). The inferior support (102) further comprises bearings (113) for receiving the locking pins (112) heads, said locking pins (112) having a body that passes through the passages holes of the under mounting (104) for fixedly supporting the under mounting (104). The inferior support may be movable.

Figure 2:
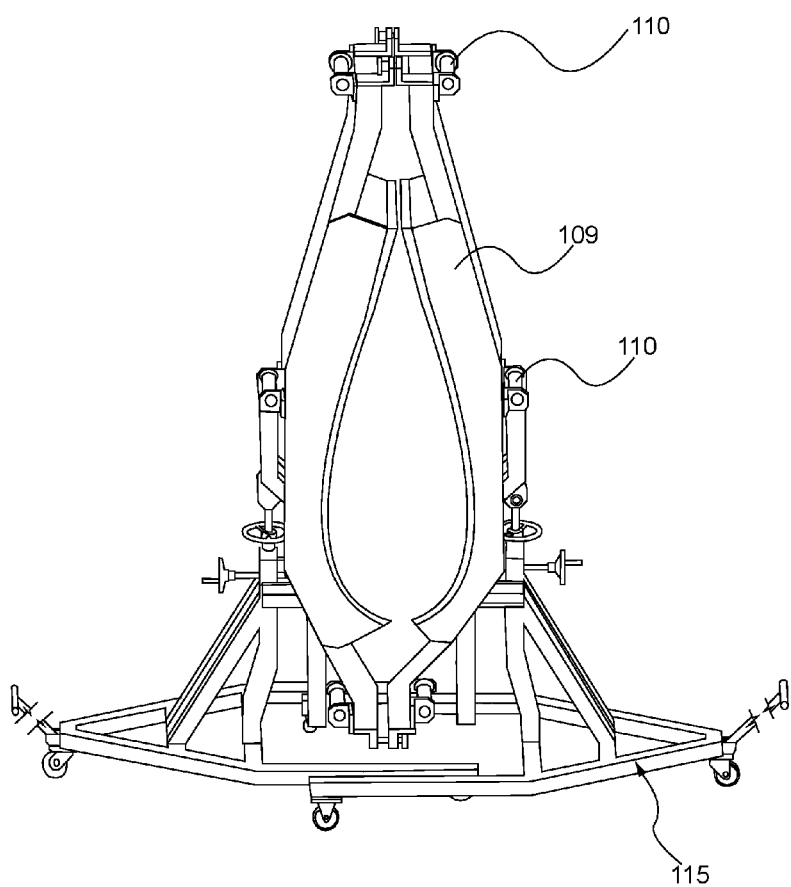
FIG. 02 is a perspective view of an embodiment of the present invention with the mounting in a substantially vertical position and one vertical support in each side of the mounting.
Figure 3:
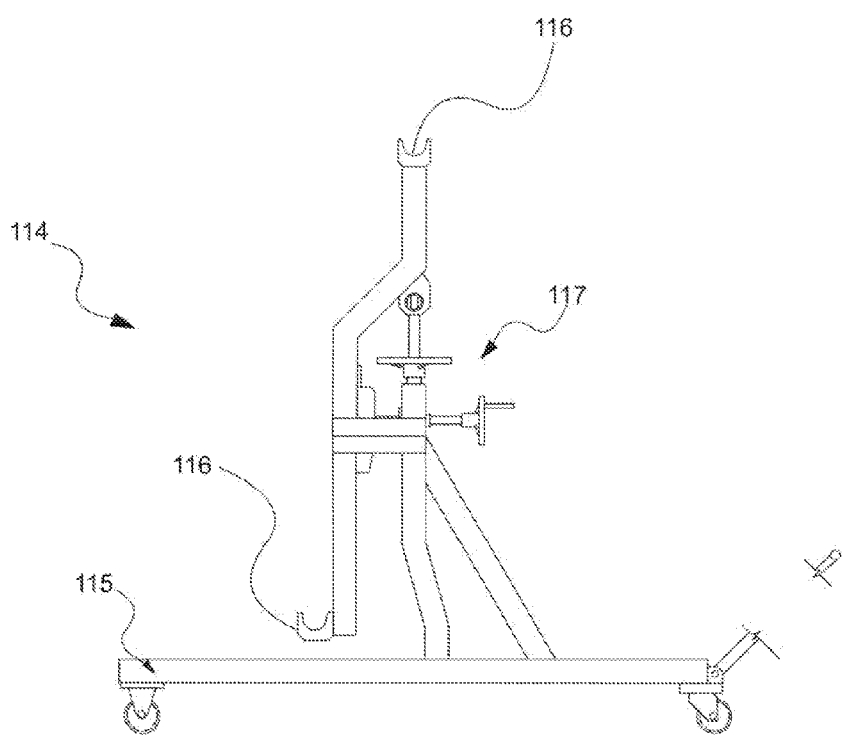
FIG. 03 is a cross sectional view of the vertical support.

FIG. 02 is a perspective view of an embodiment of the present invention with the mounting in a substantially vertical position and one vertical support in each side of the mounting. FIG. 03 is a cross sectional view of the vertical support.

The vertical support (114) is adapted to securing and detaching the upper (103) and/or under (104) mounting parts when the mounting is in the substantially vertical position. The vertical support can have a base (115) and a structural frame extending upwards the base (115). The structural frame may include bearings (116) for supporting the rollers of the upper or under mounting parts. The structural frame may have an adjustable structure (117) for the attachment of the bearings (116) in the rollers, whereby after fixing the base (115) in a defined position, the height and width of the adjustable structure (117) is fitted to receive the rollers of the under (103) or upper (104) mounting parts. The vertical support (114) may be movable. The under mounting part (104) may be adapted to be directly fixedly placed in an alternative inferior support such as an adapted cradle when the mounting is in a substantially vertical position.

In yet another aspect, the present invention may be carried out by a method of handling aerogenerator blades characterized by comprising the steps: positioning an upper mounting part over the blade after the upper mould has been retracted; lifting the blade with the upper mounting part from the under mould using a lifting means; positioning the blade over an under mounting part which is fixedly attached to an inferior movable support; attaching the upper mounting part to the under mounting part, wherein the upper and under mounting parts together have the inner surface substantially corresponding to the shape of the blade outer profile section.

The method may further comprise a step of moving the blade with the mounting using the movable inferior support from a first location to a second location. The method may further comprise a step of securing the mounting structure with a strap and detaching the fixed connection of the under mounting part to the movable inferior support.

The method may further comprise a step of removing the movable inferior support from below the under mounting part. The method may further comprise a step of rotating the mounting it its axis, together with the blade, from a first position to a second position, where said first position can be a substantially horizontal position and the second position a substantially vertical position. After removing the movable inferior support and rotating the blade with the mounting to a vertical position, a first movable vertical support can be fixedly attached to the under mounting part and a second movable vertical support can be attached to the upper mounting part.

The invention claimed is:

1. An apparatus for handling aerogenerator blades, the apparatus comprising:
    a mounting comprising an upper mounting part and an under mounting part, wherein the upper mounting part and the under mounting part are removeably attached to each other, and wherein the under mounting part comprises a plurality of passage holes, each configured to receive a locking pin therethrough;
    a strap which enables rotation of the mounting; and
    an inferior support comprising a plurality of bearings, corresponding to the plurality of passage holes of the under mounting part, wherein each of the plurality of bearings is configured to receive a locking pin therethrough;
    wherein the mounting is configured to be directly attached to the inferior support when the mounting is in a substantially horizontal position, such that, when the mounting is in the substantially horizontal position, the plurality of passage holes are aligned with the plurality of bearings, such that a plurality of locking pins, each inserted through at least one of the plurality of bearings and at least one of the plurality of passage holes, fixedly connect the mounting to the inferior support.

2. The apparatus for handling aerogenerator blades according to claim 1, further comprising:
    an under support, wherein the under mounting part is configured to be directly attached to the under support when the mounting is in a substantially vertical position.

3. The apparatus for handling aerogenerator blades according to claim 1, wherein the upper mounting part comprises:
    a main frame comprising a first lateral supporting plate and a second lateral supporting plate;
    at least one layer fixed to an inner side of the main frame by the first lateral supporting plate and the second lateral supporting plate, wherein the at least one layer comprises a surface which is shaped to substantially correspond to a shape of a side of an outer profile section of an aerogenerator blade; and
    a plurality of upper rollers connected to an outer side of the main frame.

4. The apparatus for handling aerogenerator blades according to claim 1, wherein the under mounting part further comprises:
    a main frame comprising a first lateral supporting plate and a second lateral supporting plate;
    at least one layer fixed to an inner side of the main frame by the first lateral plate and the second lateral plate, wherein the at least one layer comprises a surface which is shaped to substantially correspond to a shape of a side of an outer profile section of an aerogenerator blade; and
    a plurality of under rollers connected to an outer side of the main frame.

5. The apparatus for handling aerogenerator blades according to claim 4, wherein the plurality of passage holes are formed through the first lateral supporting plate and the second lateral supporting plate.

6. The apparatus for handling aerogenerator blades according to one of claims 3 and 4, wherein the main frame further comprises at least one end side attaching hole, formed in each of a first end and a second end of the main frame, wherein the at least one end side attaching hole is configured to receive a fastener therein for securely attaching the upper mounting part to the under mounting part.

7. The apparatus for handling aerogenerator blades according to one of claims 3 and 4, wherein the main frame further comprises a first joint plate disposed at a first end of the main frame and a second joint plate disposed at a second end of the main frame, wherein each of the first joint plate and the second joint plate comprises at least one end side attaching hole formed therein, wherein the at least one end side attaching hole is configured to receive a fastener therein for securely attaching the upper mounting part to the under mounting part.

8. The apparatus for handling aerogenerator blades according to claim 1, wherein the inferior support is movable and comprises a plurality of wheels.

9. The apparatus for handling aerogenerator blades according to claim 1, further comprising a vertical support for securing and detaching one of the upper mounting part and the under mounting part when the mounting is in a substantially vertical position.

10. The apparatus for handling aerogenerator blades according to claim 9,
wherein the upper mounting part comprises an upper main frame and a plurality of upper rollers connected to an outer side of the upper main frame, and the under mounting part comprises an under main frame and a plurality of under rollers connected to an outer side of the under main frame;
wherein the vertical support comprises a base and a structural frame extending upwards from the base,
wherein the structural frame comprises a plurality of bearings configured to support one of the upper rollers and the under rollers.

11. The apparatus for handling aerogenerator blades according to claim 10, wherein the structural frame is adjustable, such that after fixing the base in a defined position, a height of the adjustable structure and a width of the adjustable structure are adjustable to receive one of the upper rollers and the under rollers.

12. The apparatus for handling aerogenerator blades according to claim 9, wherein the vertical support is movable and comprises a plurality of wheels.

13. An apparatus for handling aerogenerator blades, the apparatus comprising:
a mounting comprising:
an upper mounting part and an under mounting part which are configured to hold an aerogenerator blade therebetween, wherein the under mounting part comprises a plurality of passage holes;
a strap which enables a rotation of the mounting;
an inferior support which supports the mounting in a substantially horizontal position in which the upper mounting part is positioned substantially above the under mounting part, wherein the inferior support comprises a plurality of first bearings which support a plurality of locking pins passing through the plurality of passage holes of the under mounting part; and
a first vertical support and a second vertical support which support the mounting in a substantially vertical position in which the upper mounting is laterally positioned with respect to the under mounting part,
wherein the first vertical support comprises a base and a structural frame extending upwards from the base, the structural frame comprising second bearings which support the upper mounting part, and
wherein the second vertical support comprises a base and a structural frame extending upwards from the base, the structural frame comprising third bearings which support the under mounting part;
wherein the strap is configured to hold the mounting aloft during rotation between the substantially horizontal position and the substantially vertical position.

* * * * *